I. W. DOUGLAS.
CORN PLANTER.
APPLICATION FILED APR. 22, 1913.
1,092,030. Patented Mar. 31, 1914.
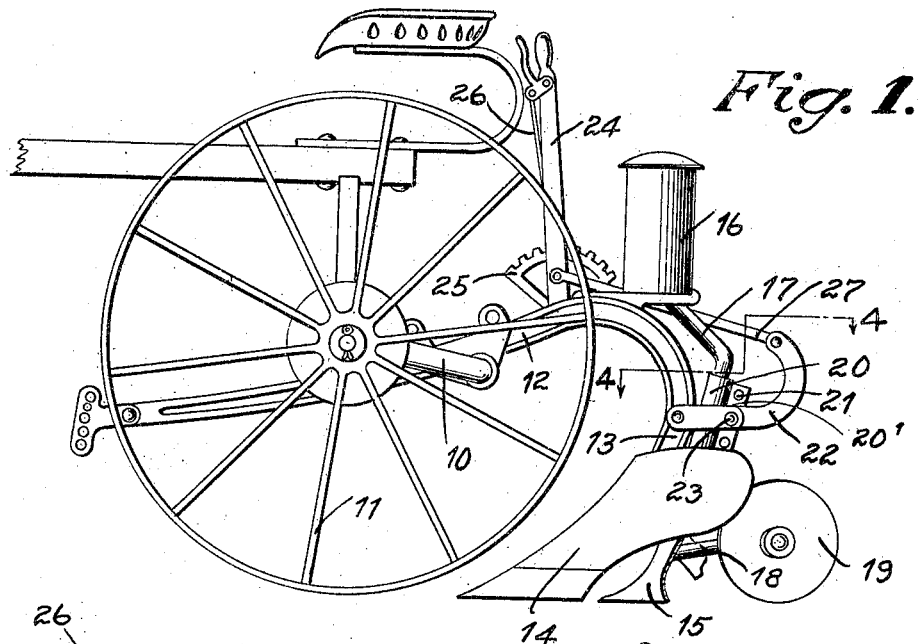
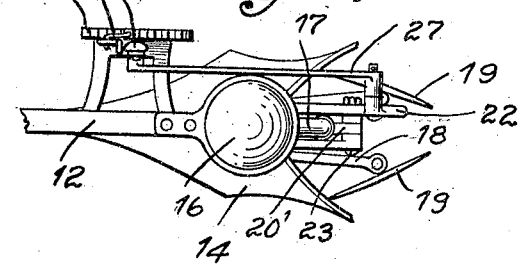
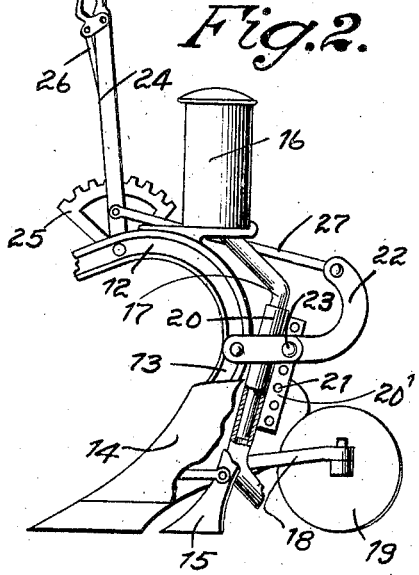
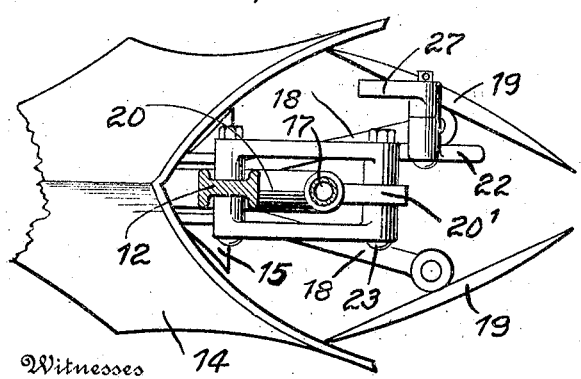
Witnesses
M. S. Watson
Henry T. Bright
Inventor
I. W. Douglas
By Chandler & Chandler
Attorneys

UNITED STATES PATENT OFFICE.

IRA W. DOUGLAS, OF LITCHFIELD, NEBRASKA.

CORN-PLANTER.

1,092,030.

Specification of Letters Patent. Patented Mar. 31, 1914.

Application filed April 22, 1913. Serial No. 762,920.

*To all whom it may concern:*

Be it known that I, IRA W. DOUGLAS, a citizen of the United States, residing at Litchfield, in the county of Sherman, State of Nebraska, have invented certain new and useful Improvements in Corn-Planters; and I do hereby declare the following to be a full, clear, and exact description of the invention, such as will enable others skilled in the art to which it appertains to make and use the same.

This invention relates to corn planters and particularly to that type which includes a listing plow, drill and means for covering the seed after it has been dropped from the drill.

The object of the invention resides in the provision of an implement of the character named which includes a subsoiler and disks and improved means for raising and lowering the subsoiler and disks to effect the planting of the corn at an even depth irrespective of the contour of the ground over which the machine is traveling.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a planter constructed in accordance with the invention; Fig. 2, a side elevation partly in section of a fragment of what is shown in Fig. 1; Fig. 3, a plan view of a fragment of what is shown in Fig. 1; Fig 4, a section on the line 4—4 of Fig. 1.

Referring to the drawings the planter is shown as comprising an axle 10 supported by wheels 11 in the usual and well known manner. Supported upon the axle 10 is a plow beam 12 which terminates in the usual standard 13 and upon this standard is mounted the lister plow 14. Pivotally mounted on the standard 13 for up and down movement is a subsoiler 15, said subsoiler being disposed between the wings 14. Mounted upon the beam 12 is a hopper 16 which delivers seed grain to a drill tube 17. Extending rearwardly from the subsoiler 15 are brackets 18 and journaled on the rear ends of these brackets are the usual disks 19. The subsoiler 15 is provided with an upward tubular extension 20 having formed thereon a lateral wing 20' having a plurality of bolt openings 21, said tubular extension slidably receiving the conducting tube 17. Pivoted to one side of the standard 13 is a lever 22 which is connected to the wing 20' by means of a bolt 23 passing through the lever and through one of the openings 21. Pivoted on the beam 12 is an operating lever 24 and fixed on said beam adjacent the operating lever is a toothed segment 25 with which coöperates a spring pawl mechanism 26 carried by the lever 24. The lever 24 is connected to the free end of the lever 22 by means of a link 27. By this construction it will be apparent that when the lever 24 is moved forwardly the subsoiler 15 and disks 19 will be elevated and that when said lever is moved rearwardly the subsoiler 15 and disks 19 will be lowered. By thus adjusting said subsoiler 15 and disks 19 it will be apparent that the depth at which the seeds are planted may be kept uniform irrespective of the contour of the ground over which the machine is traveling and as a result a more even stand of corn will be obtained.

What I claim is:—

In a planter, the combination of a wheeled frame, a plow beam supported thereby, a plow carried by the beam, a subsoiler disposed at the rear of said plow and pivotally connected with the beam, for up and down movement, a lever pivoted on the beam, and having an adjustable connection with the subsoiler whereby the oscillation of the latter will raise and lower the subsoiler, a second lever pivoted on the beam, a link connecting the second lever with the first lever, and means for locking the second lever against pivotal movement.

In testimony whereof, I affix my signature, in the presence of two witnesses.

IRA W. DOUGLAS.

Witnesses:
WM. BOECKING,
H. L. LANG.